United States Patent [19]
Sheaffer et al.

[11] Patent Number: 5,311,836
[45] Date of Patent: * May 17, 1994

[54] VENTILATED CAGE AND OPEN RACK SYSTEM

[75] Inventors: John E. Sheaffer, Perryville; Eric A. Deitrich, Woodbine, both of Md.

[73] Assignee: Lab Products, Inc., Maywood, N.J.

[*] Notice: The portion of the term of this patent subsequent to Nov. 24, 2009 has been disclaimed.

[21] Appl. No.: 975,033

[22] Filed: Nov. 12, 1992

Related U.S. Application Data

[63] Continuation of Ser. No. 596,808, Oct. 12, 1990, Pat. No. 5,165,362, which is a continuation-in-part of Ser. No. 515,803, Apr. 27, 1990, Pat. No. 4,989,545.

[51] Int. Cl.5 ............................................... A01K 1/00
[52] U.S. Cl. .......................................... 119/17; 119/15
[58] Field of Search .................... 119/15, 17, 18, 19

[56] References Cited

U.S. PATENT DOCUMENTS

| | | | |
|---|---|---|---|
| 3,002,492 | 10/1961 | Naturale | 119/18 |
| 3,256,859 | 6/1966 | Petit | 119/18 |
| 3,358,649 | 12/1967 | Gabriel | 119/18 |
| 3,381,665 | 5/1968 | Naturale | 119/18 |
| 3,572,292 | 3/1971 | Schroen | 119/18 |
| 3,699,925 | 10/1972 | Van Dongen | 119/18 |
| 4,480,587 | 11/1984 | Sedlacek | 119/15 |
| 4,593,650 | 6/1986 | Lattuada | 119/15 |
| 4,940,017 | 7/1990 | Nike et al. | 119/18 |
| 5,000,120 | 3/1991 | Coiro et al. | 119/15 |

*Primary Examiner*—John G. Weiss
*Attorney, Agent, or Firm*—Stroock & Stroock & Lavan

[57] ABSTRACT

A wire bar lid for use in an animal cage is provided having a thin perimeter having a substantially rectangular cross-section. A plurality of wires are supported within the perimeter below the plane of the perimeter.

4 Claims, 8 Drawing Sheets

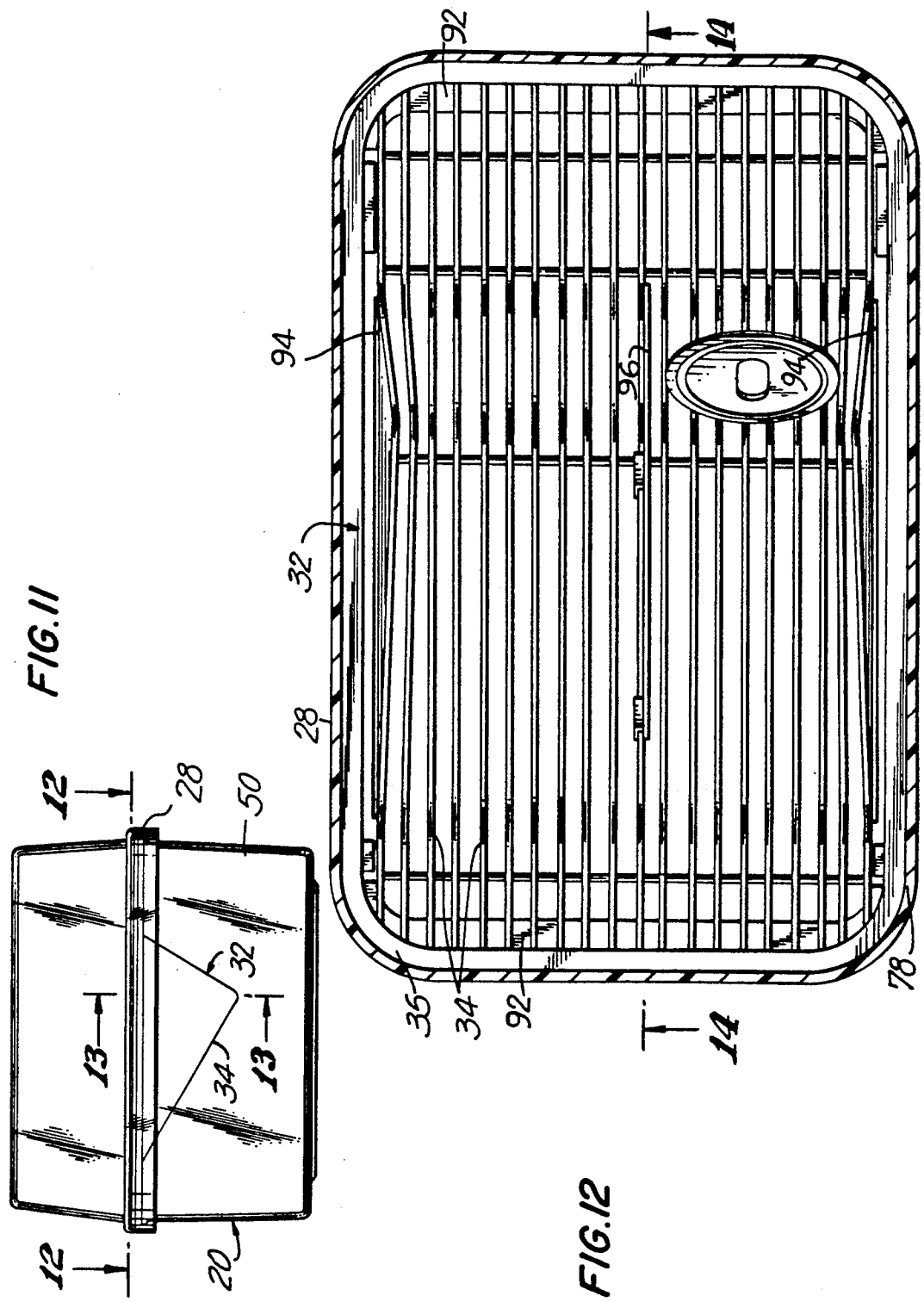

VENTILATED CAGE AND OPEN RACK SYSTEM

This is a continuation of U.S. patent application Ser. No. 07/596,808, filed on Oct. 12, 1990 and is now U.S. Pat. No. 5,165,362 which is a continuation-in-part of Ser. No. 07/515,803 which was filed on Apr. 27, 1990 and is now U.S. Pat. No. 4,989,545.

BACKGROUND OF THE INVENTION

This invention is directed to a ventilated cage and rack system, and more particularly to an open rack system which provides protection for both personnel attending to the system and animals contained within the cage from contamination by reducing cross cage contamination.

Ventilated cage and rack systems are well known in the tart. One such ventilated cage and rack system is disclosed in U.S. Pat. No. 4,365,590 assigned to Lab Products, Inc. in which a closed rack system including a plurality of shelves each having a door for each shelf is provided, Each shelf compartment is sized to contain horizontally spaced animal cages having open top ends spaced well below the ceiling of the shelf compartment. A low pressure air plenum extends along one side of the rack system to provide air to each of the shelves. The opposed side of each shelf has filtered air port openings which communicate with the room interior to provide a low pressure negative air flow across the top open ends of the animal cages. This cage and rack system also provides a watering system in which a water valve connected to a common water manifold extends into the cage to allow animals to drink therefrom.

The prior art ventilated cage and rack system was satisfactory. However, it suffered from the deficiencies that it can not provide a cage level barrier as the barrier was breached by the insertion of the valve coupled to the main watering system each time the cage was removed from the rack system and then re-inserted into the rack system. Additionally, the air flow for a single cage could not be controlled. Accordingly, inadequate personnel protection is provided by this ventilated cage and rack system.

One such solution to the cage barrier problem was to provide a quick disconnect valve within the ventilated cage and rack system so that the cage and the drinking valve could be disconnected from the rack while making it possible to maintain the drinking valve within the same cage at all times, thus preventing cross contamination due to reinsertion of the drinking valve. Additionally, a positive air pressure plenum provides positive air pressure through the cage in addition to the negative air flow across the tops of the cages.

This ventilated cage and rack system was also satisfactory. However, it also suffered from the disadvantage that no personnel protection was provided when the rack doors were opened. Furthermore, it was found that to provide the negative air plenum and positive air plenum that a great deal of air was required to move an air column along the large space between the cage top and the bottom of the next highest shelf. Accordingly, amounts of energy and high air velocities were required to move the column of air across the cage tops.

The cages used in the prior art system have a filtered top and gas impermeable bottom which are closed in a petri dish manner. The top is formed with a lip which rests on and overhangs the bottom. A wire bar lid is disposed between the top and bottom to contain the animal in the cage as well as hold a water bottle and/or feed in an animal accessible position. The conventional lid includes a wire frame having a circular cross-section with lateral wire rods welded to the frame, creating a ¼ inch gap between the filter top and cage bottom. Air passes through the gap created at the meeting point of this top and bottom letting contaminated air out and letting outside air within the cage. However, when a positive pressure air flow is provided within the cage this gap allows bedding and debris to be discharged from the cage by the activity of the animals contained with the cage. Accordingly, cross contamination can occur when two cages are positioned adjacent each other on the shelf. Additionally, personnel contamination occurs as the contaminated gases pass from the cages to the rack.

One attempt to cure this cross contamination problem is known in U.S. Pat. No. 4,343,261 in which all air flow is directed entirely through the filter of a cage top positioned in the rack. However, this cage and rack system suffers from the disadvantage of forcing contaminants disposed on the filter top into the cage.

Accordingly, it is desired to provide a ventilated cage and rack system which overcomes the shortcomings of the prior art by combining both personnel protection and animal protection at a cage level barrier while decreasing the volume of air and energy required to do so.

SUMMARY OF THE INVENTION

Generally speaking, in accordance with the instant invention, a ventilated cage and rack system for providing air ventilation directly to the animals within a cage level barrier is provided. The rack includes a plurality of shelves, each shelf is formed as an air plenum so that air may travel within the shelf to a plurality of predetermined positions within the rack. At least one cage level barrier having a filter bonnet is positioned on a shelf, so that the shelf removes air disposed adjacent the bonnet. A cage guide formed in substantially the same shape as the bonnet is affixed to the bottom of the shelf so that when the barrier cage is placed within the ventilated rack, it is positioned within the cage guide. The cage guide is separated from the bonnet by a relatively small distance. The air plenum shelf is provided with a negative pressure to remove gases from above the cage bonnet.

In another embodiment of the invention, an air diffuser is disposed within the sidewall of the cage bottom. A positive air pressure plenum supplies air to a plurality of predetermined positions along each shelf within the rack. The positive pressurized air is passed from the positive air pressure plenum to the cage through the air diffuser.

In another embodiment of the invention, the shelf air plenum is a positive air plenum. Air passes through the air plenum to push air about the cage bonnet away from the bonnet thereby continuously removing the exhaust air from the cage.

Yet another embodiment includes a water manifold contained within the positive air plenum to provide water at the predetermined position along the shelf. A drinking valve disposed within the air diffuser receives the water. A quick release coupling connects the water manifold with the drinking valve.

A lid is provided having a flat (rectangular cross-sectioned) frame for resting on the cage bottom. A skirt integrally formed with the frame extends therefrom at a substantially right angle. A flange extends from the skirt. A plurality of metal rods are mounted on the flange away from the frame.

Accordingly, it is an object of the instant invention to provide an improved ventilated cage and rack system.

Another object of the invention is to provide a cage level barrier cage which reduces cross contamination between cages.

A further object of the invention is to provide a ventilated cage and rack system which provides both personnel protection and animal protection at a cage level barrier.

Another object of the invention is to provide an open rack ventilated cage and rack system.

Still another object of the invention is to provide a simplified ventilated cage and rack system in which each shelf acts as an exhaust plenum for the cages located below it and as a shelf support for the cages located above it.

Yet another object of the invention is to provide a ventilated cage and rack system in which a cage may be removed without affecting the operation of the remaining cages.

A further object of the invention is to provide a lid which reduces the gap between cage top and cage bottom.

Still another object of the invention is to provide a lid which prevents bedding and debris kicked up by animals within the cage from exiting the cage.

Still other objects and advantages of the invention will in part be obvious and in part be apparent from the specification.

The invention accordingly comprises the features of construction, combination of elements, and arrangements of parts which will be exemplified by the constructions hereinafter set forth and the scope of the invention will be indicated in the claims.

BRIEF DESCRIPTION OF THE DRAWINGS

For a fuller understanding of the invention,, reference is had to the following description taken in connection with the accompanying drawings, in which:

FIG. 1a is a top plan view taken through line 1a-1a of FIG. 1;

FIG. 11 is a side elevational view of a wire bar lid constructed in accordance with the invention supported within a cage;

FIG. 12 is a sectional view taken along line 12—12 of FIG. 11;

DETAILED DESCRIPTION OF THE PREFERRED EMBODIMENTS

Figure 1:
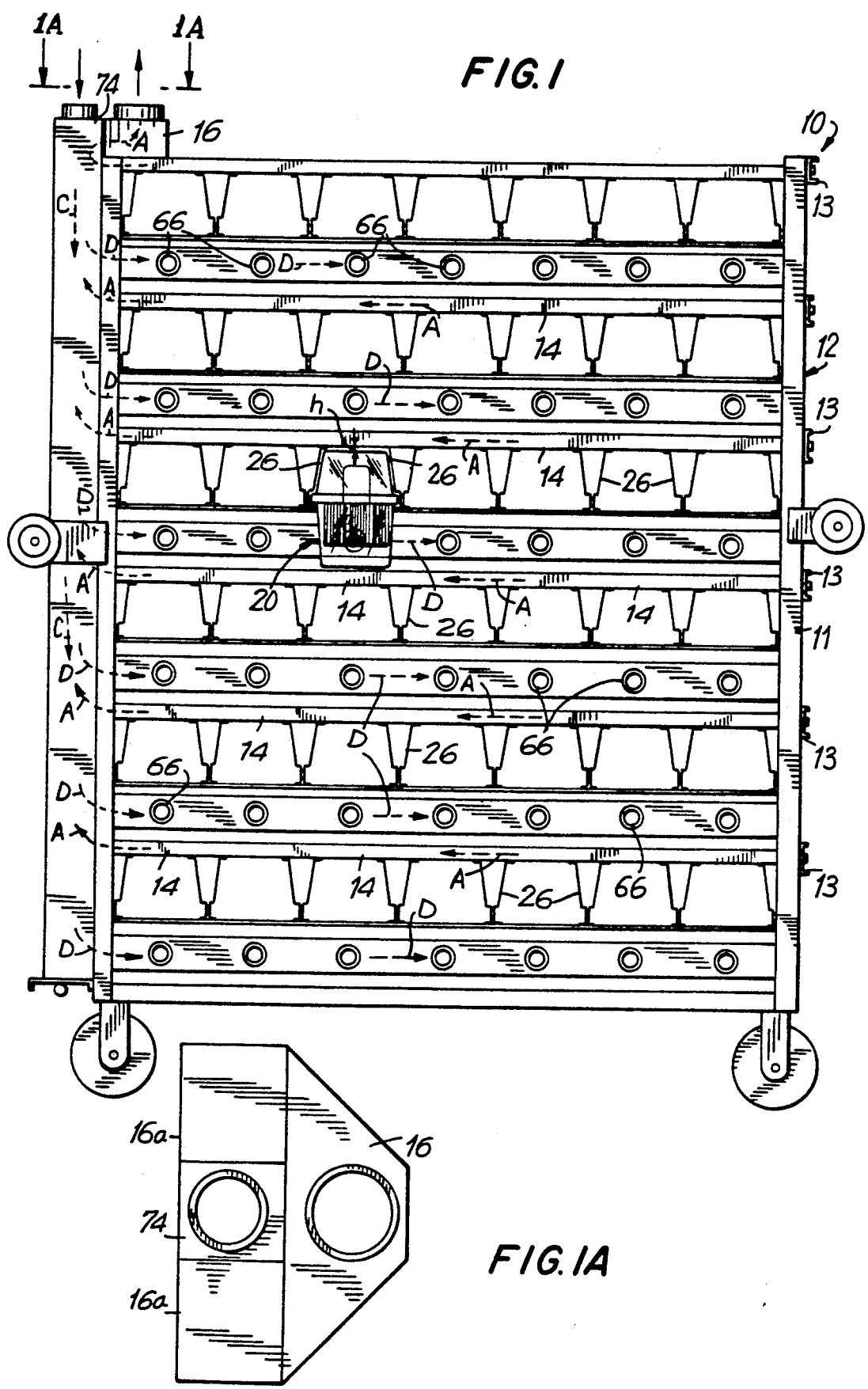
FIG. 1 is a front elevational view of the ventilated cage and rack system constructed in accordance with a preferred embodiment of the invention.
Figure 2:
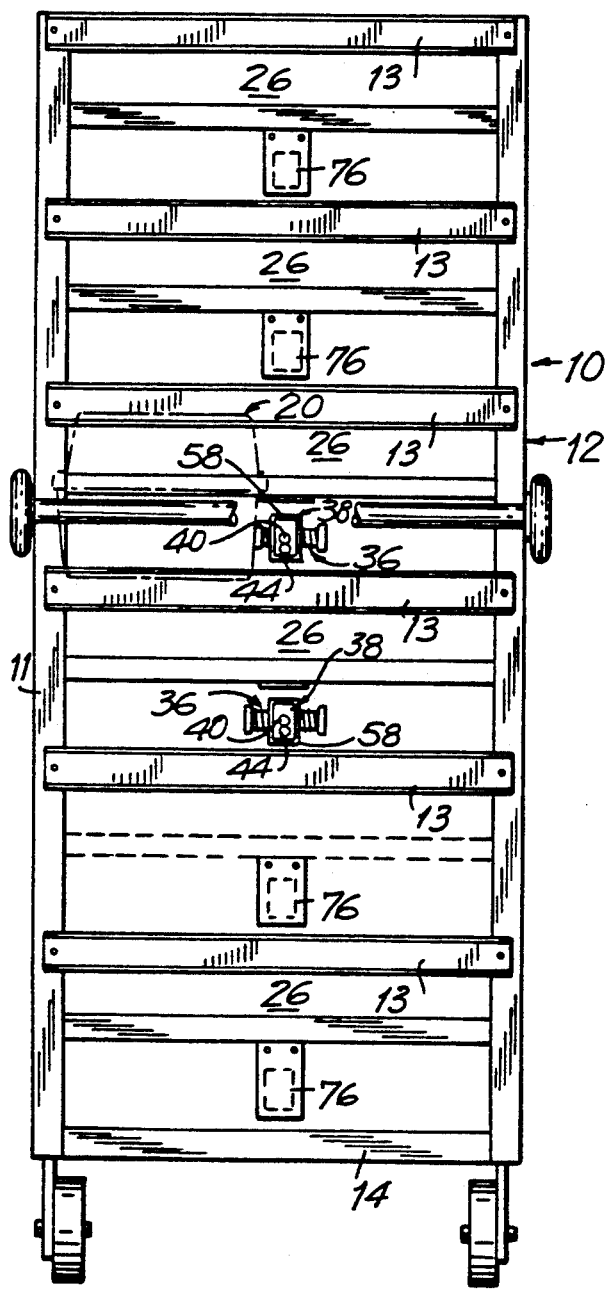
FIG. 2 is a partial sectional view of the ventilated cage and rack system constructed in accordance with the invention.
Figure 3:
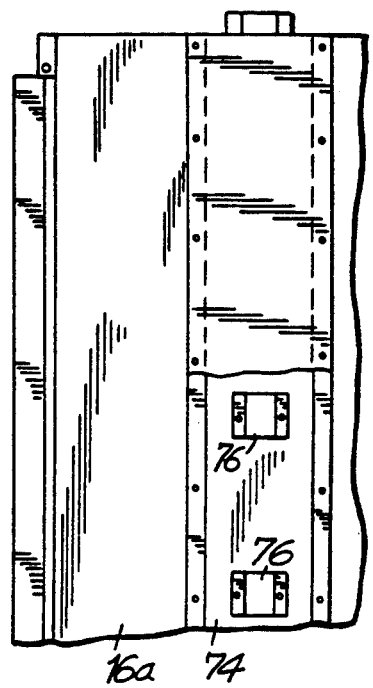
FIG. 3 is an enlarged sectional view of an air plenum constructed in accordance with the invention.

Reference is first made to FIGS. 1 and 2 wherein a ventilated cage and rack system, generally indicated at 10, constructed in accordance with the invention is shown. Ventilated cage and rack system 10 includes an open rack 12 having a frame including corner posts 11 which are connected to each other and supported by each other by a cross bar 13 positioned between adjacent corner posts 11. The opposed side of rack 10 includes a wall forming exhaust plenum 16 extending parallel to corner post 11. A plurality of shelves 14 are disposed in parallel between corner posts 11 and rack exhaust plenura 16.

A plurality of cage level barriers 20 (cages 20) are positioned within rack 12 on shelves 14. Each cage 20 is formed of a gas impermeable bottom portion 22 having an upstanding sidewall 50 and a filter bonnet 24. Bonnet 24 having a lip 28 is an open top bonnet having a filter therein of the type disclosed in U.S. Pat. No. 4,480,587. Cages 20 are positioned within rack 12 by canopy guides 26. Canopy guides 26 extend from the bottom of each shelf 14 and are positioned in pairs across a distance slightly less than the width of cages 20 canopy guides 26 are shaped to substantially parallel the shape of bonnet 24, so that along with shelf 14 to form a small gap h sufficient to allow movement of gases between canopy guide 26 and bonnet 24 is present. In an exemplary embodiment, gap h is 3/16 of an inch to ¼ of inch. Canopy guides 26 profile bonnet 24 and overlap a bottom lip 28 of bonnet 24 creating a tension fit against the sidewall of bonnet 20. One end of canopy guide 26 is fixed to rack 12 (FIG. 5) while the other end of canopy 26 is free floating along the horizontal direction and spaced from an adjacent canopy 26 by a spring 30 to allow easy positioning of cage 20 within canopy guides 26.

Since canopy 26 surrounds bonnet 24 including lip 28 canopy 26 effectively isolates bonnet 24 from the remainder of the cage. Accordingly, any gases passing from cage 20 around lip 28 remain in canopy 26 until removed by a shelf plenum 14. Additionally, because lip 28, is contained within canopy 26 when cage 20 is positioned therein contamination due to gas exchange between adjacent cages is severely reduced.

Shelf 14 is an air plenum which communicates with exhaust plenum 16 as well as with gap h through openings 18 provided at the bottom of each shelf 14. Openings 18 are positioned between canopy guides 26 to correspond with a position above and to the rear of each bonnet 24 of each cage 20.

Shelf plenums 14 communicate with rack exhaust plenum 16 through exhaust plenum ducts 16a. Exhaust plenum 16 may be connected with a barrier room house exhaust system. Exhaust plenum 16 is a negative pressure plenum so that air is drawn through openings 18 from above bonnet 24, through shelf 14 in the direction of arrows A, through exhaust plenum duct 16a and into the house exhaust system through rack exhaust plenum 16. Air is drawn from canopy 26 from around bonnet 24 removing contaminated air which escapes cage 20. By providing a ventilated rack and cage system utilizing a negative pressure plenum in which air is drawn from a small confined space provided by canopy guides 26, an open ventilated rack is provided which also provides for personnel protection as well as animal protection.

Figure 4:
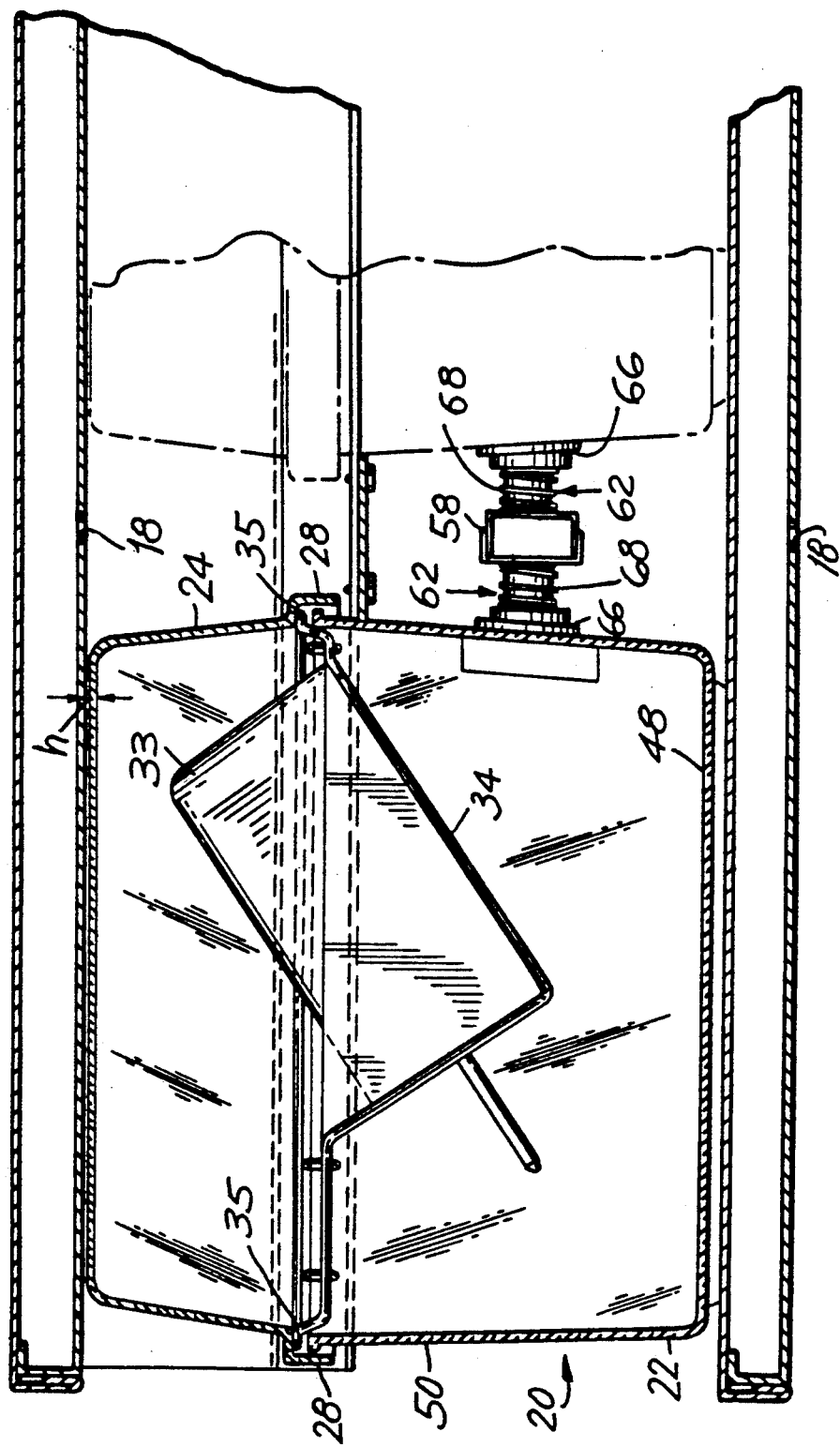
FIG. 4 is an enlarged sectional view of a cage positioned within the ventilated cage and rack system constructed in accordance with a second embodiment of the invention.
Figure 5:
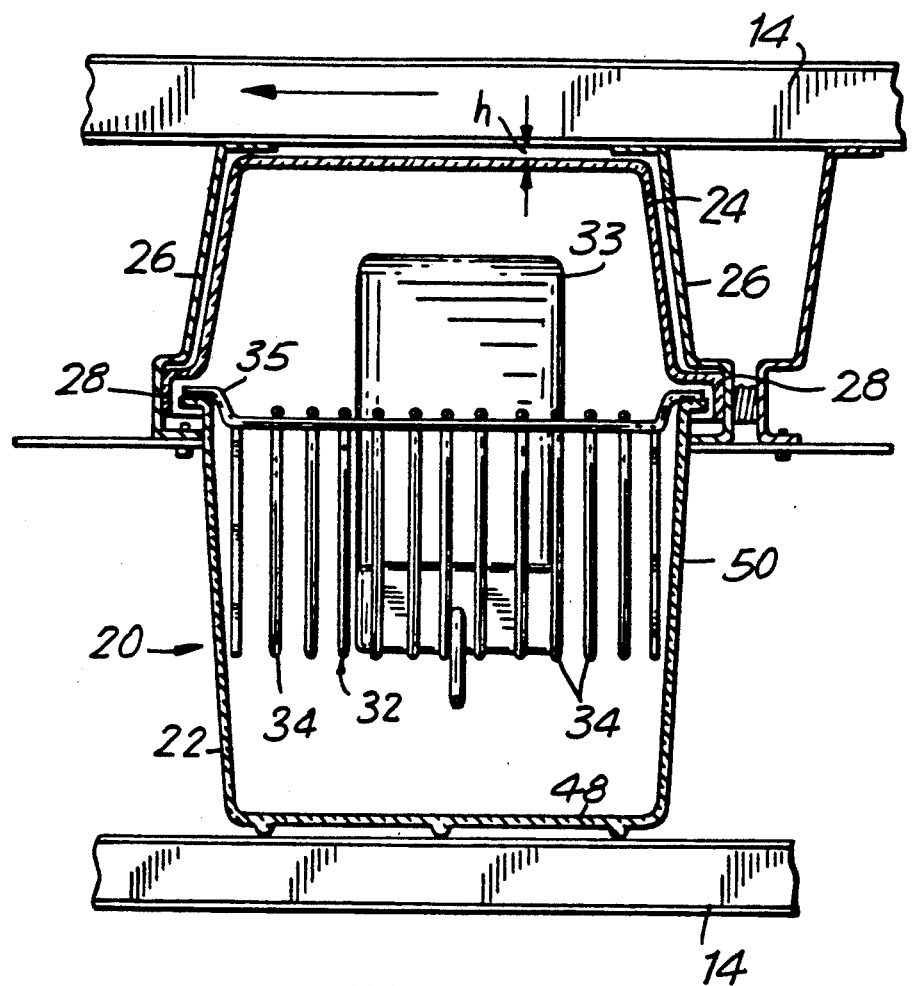
FIG. 5 is an enlarged front elevational view showing the cage of FIG. 1.
Figure 6:
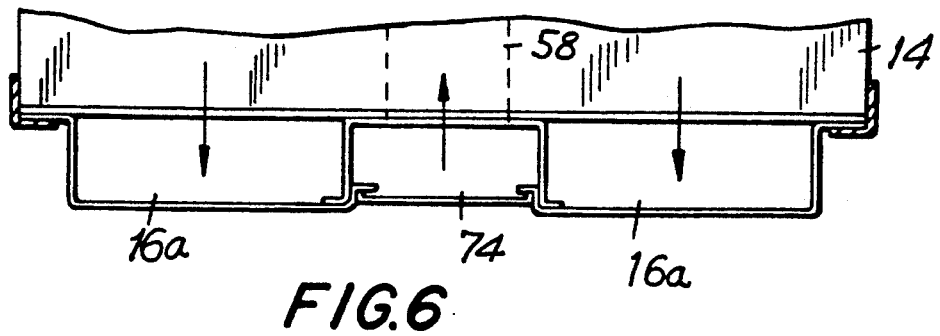
FIG. 6 is a sectional view taken along line 6—6 of FIG. 1.

In the simplest embodiment of the negative pressure ventilated cage and open rack, no water is provided from an outside source to cages 20. Accordingly, water is provided from a supply positioned within the cage. As seen in FIGS. 1, 4 and 5, a wire bar lid 32 is positioned within bottom portion 22 of each cage 20. A water bottle 33 is positioned therein to supply water for animals contained within cage 20. Wire bar lid 32 includes a plurality of wire bars 34 which form a holder for water bottle 33 as well as extend to the top of sidewall 50 to be supported thereon and are sandwiched between bonnet 24 and sidewall 50 to be maintained in place.

Conventional wire bar lids are constructed of wire bars having a generally round cross-section so that a gap results between sidewall 50 and bonnet 24. When air is removed from about Donnex 24 by negative pressure plenum 14, a Venturi effect occurs which causes air to move around lip 28 of bonnet 24 breaking the cage level barrier. This air is then drawn out of and away from the cage by the negative air flow of plenum shelf 14. Accordingly, no product protection is provided even though personnel protection is provided. Experiments and use have also shown, that bedding and debris are discharged from the cage by the animal activity within the cage. Accordingly, personnel protection may be compromised during use of the conventional wire bar lid. Additionally, cross-contamination between cages occurs when bedding and debris escapes one cage, contaminates the environment and enters another cage.

Experiments have shown that by providing a thinned wire bar lid 32 having a flattened perimeter frame 35 of a thin substantially rectangular cross-section for resting on bottom 22, the gap is reduced. This reduces the Venturi effect and aides in maintaining the cage level barrier of cage 20.

Reference is now made to FIGS. 11-14 in which wire bar lid, generally indicated as 32, constructed in accordance with the invention is shown in detail. Bar lid 32 is formed of thin metal wire around the perimeter frame 35, i.e. perimeter 35 has a flat thin substantially rectangular cross-section. A skirt 90 extends from frame 35 at a substantially right angle from frame 35 so as to be substantially parallel to upstanding wall 50 of bottom portion 22. Skirt 90 is integrally formed with frame 35 forming a deflection barrier which extends around the entire top lip 91 of bottom portion 22 when wire bar lid 32 is positioned in the bottom portion. A support flange 92 extends from skirt 90. The plurality of wire bars 34 are attached to support flange 92 away from frame 35 and top lip 91 of upstanding wall 50 of bottom portion 22.

Figure 13:
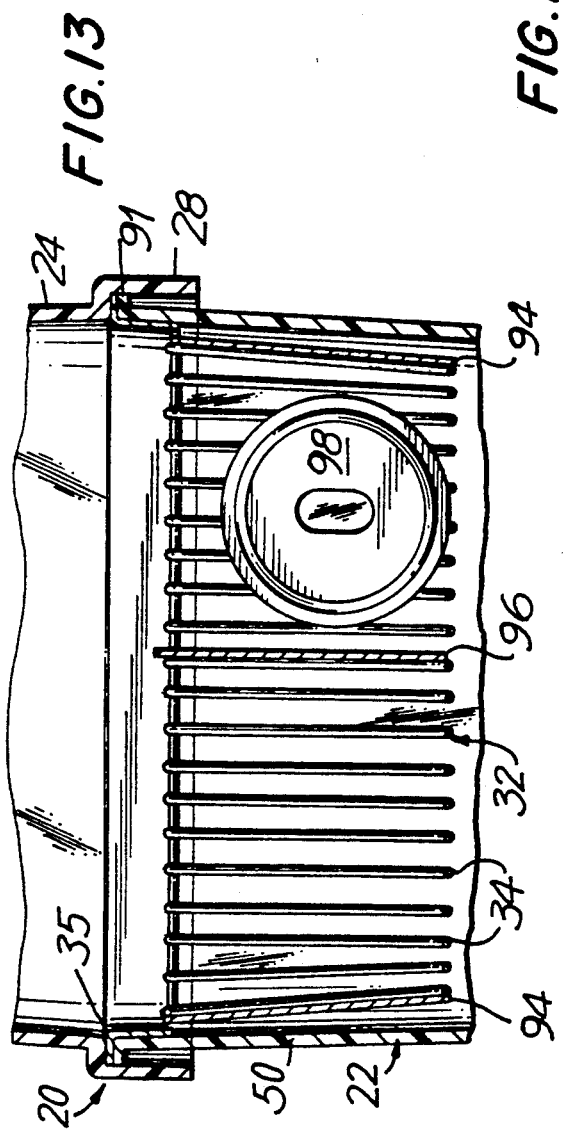
FIG. 13 is a sectional view taken along line 13—13 of FIG. 11.
Figure 14:
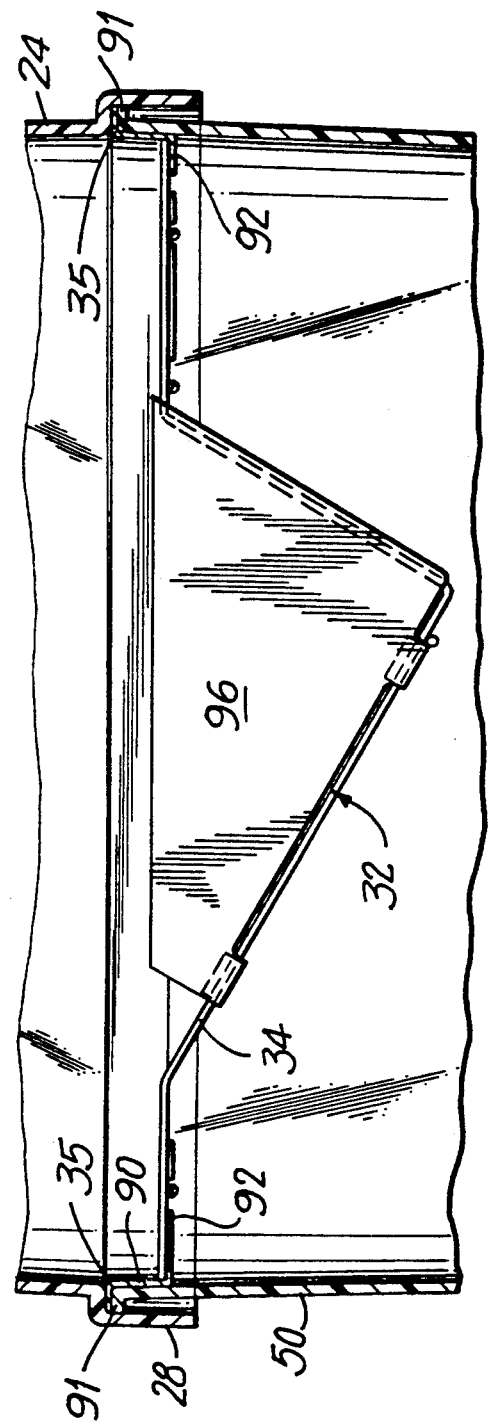
FIG. 14 is a sectional view taken along line 14—14 of FIG. 12.

In an exemplary embodiment, support flange 92, skirt 90 and frame 35 may be formed as a single integral piece of stainless steel. Frame 35 is dimensioned to rest on lip 91 of bottom portion 22 of cage 20. Each corner of frame 35 is radiused to conform to the shape of cage 20. Wire bars 34 are welded to support flange 92. To facilitate providing feed and water, wire bar lid 32 includes containment ends 94 positioned at either side of lid 32 as shown in FIG. 13. A divider 96 is rotatably mounted on a single wire 34 between end plates 94 to allow the sectioning of lid 32 when desired. Additionally, a protective plate 98 is provided for receiving a water bottle.

By providing a wire bar lid having a flat perimeter and the lateral round wire bars supported below the perimeter of the lid, the perimeter, which is sandwiched between lip 28 and lip 91, substantially eliminates the gap between cage top 24 and cage bottom 22. This prevents the debris and bedding kicked up by the animals within the cage from escaping from cage 20 and reduces the Venturi effect on cage 20 thereby effectively maintaining the cage level barrier of cage 20.

By providing canopy guides 26, the air to be removed from the area surrounding bonnet 24 is limited to that provided within gap h. This effectively reduces the amount of air which must be removed when compared to the prior art ventilated cage and rack which required the passing of air across the tops of the cages rather than removal of air from each isolated cage 20. Accordingly, since a smaller area is utilized, the exhaust plenum may be operated at a lower air velocity utilizing less energy to provide the same function as in the prior art ventilated rack.

In a second embodiment of the invention, the rack may be operated in a positive pressure mode. Air is input from a house supply system through plenum 16 and flows in a direction opposite to that of arrows A through plenum shelf 14 and openings 18. The air then surrounds bonnet 24 and removes the air positioned above bonnet 2 4. Bonnet 24 includes a filter therein so that the positive pressure air which flows into the cage is filtered air. A Venturi effect is again created. In this case the Venturi effect also works to cause air to be blown through the gap provided between bottom portion 22 and bonnet 24. However, this problem can be alleviated by utilizing wire bar lid 32. Furthermore, the air being blown into the cage is only that which is within canopy 26, primarily the filtered air from shelf plenum 14. Therefore, no cross contamination occurs. This embodiment provides product protection but does not provide personnel protection as air is blown out of ventilated rack 12.

In a third embodiment provided in FIGS. 2, 3 and 7-10, positive air pressure is provided to each cage 20 through a second air supply system and air is removed from cage 20 by negative air pressure applied through each plenum shelf 14. Additionally, in an exemplary embodiment, a common water supply is utilized to transport water to each individual cage. Reference is specifically made to FIG. 2 wherein a transporting structure, generally indicated at 36 for providing water and air to each individual cage 20 is provided. Transporting structure 36 includes a water manifold known in the art for delivering water to each cage 20. The water manifold includes a water source at one end and a drain at its opposite end to provide a water flow path which traces a generally serpentine path within rack 12 so that a pipe pair, generally indicated at 38, formed by a first pipe 40 and a second pipe 44 is disposed adjacent and parallel to a respective shelf 14. Pipe pairs 38 are connected to each other to form a water path between first pipe 40 and second pipe 44. Water travels from first pipe 40 through an elbow to a second pipe 44 allowing water to pass each cage 20 of each shelf 14 contained within rack 12. A number of female valve couplings 46 at least equal to the number of cages 20 positioned within each rack 12 extend from first pipe 40 towards cage 20 at predetermined intervals.

Figure 8:
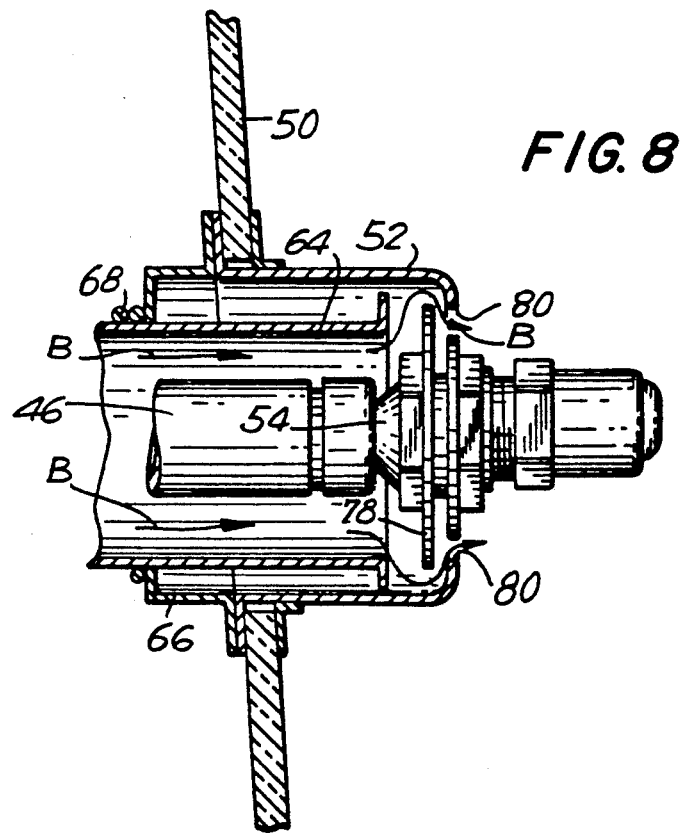
FIG. 8 is a sectional view showing the water manifold and air plenum of FIG. 7 in a docking position.
Figure 9:
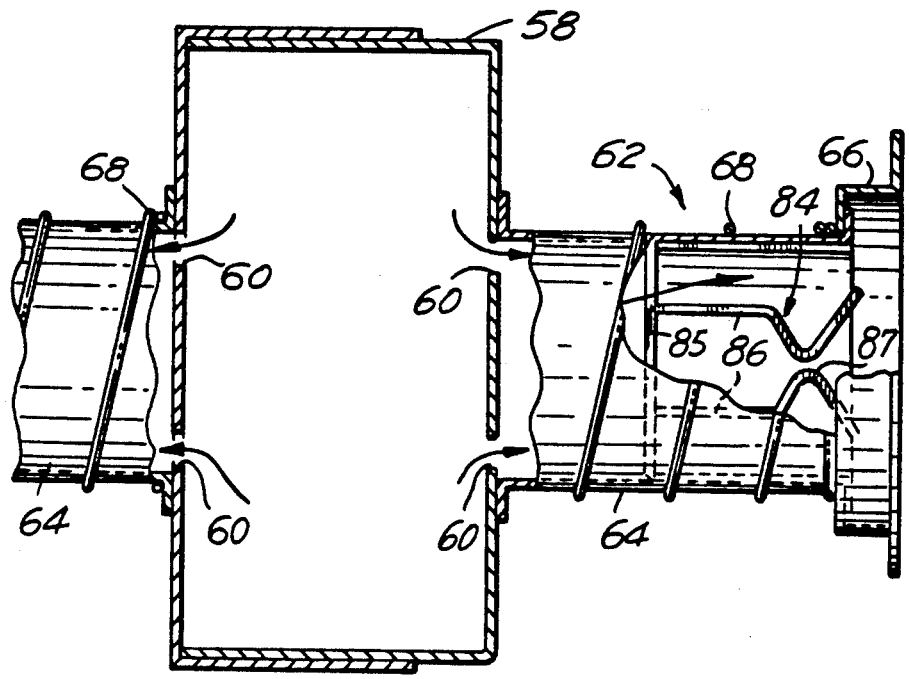
FIG. 9 is a sectional view of an air plenum constructed in accordance with the invention.
Figure 10:
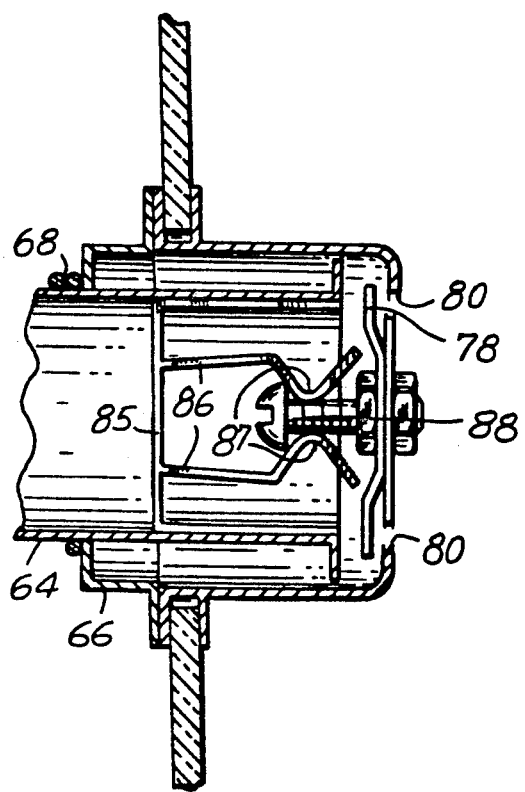
FIG. 10 is a fragmented sectional view of the docking mechanism for the air plenum in a docked position.

Each bottom 22 is formed with a floor 48 and a wall 50 extending therefrom. As seen in FIG. 8 a recessed air diffuser 52 is formed in wall 50. A drinking valve 56 extends from air diffuser 52 within cage 20. A male coupling valve 54 is dimensioned to be received by female coupling valve 46 causing female coupling valve 46 to open, thus allowing water to flow from pipe 40 to drinking valve 56.

Figure 7:
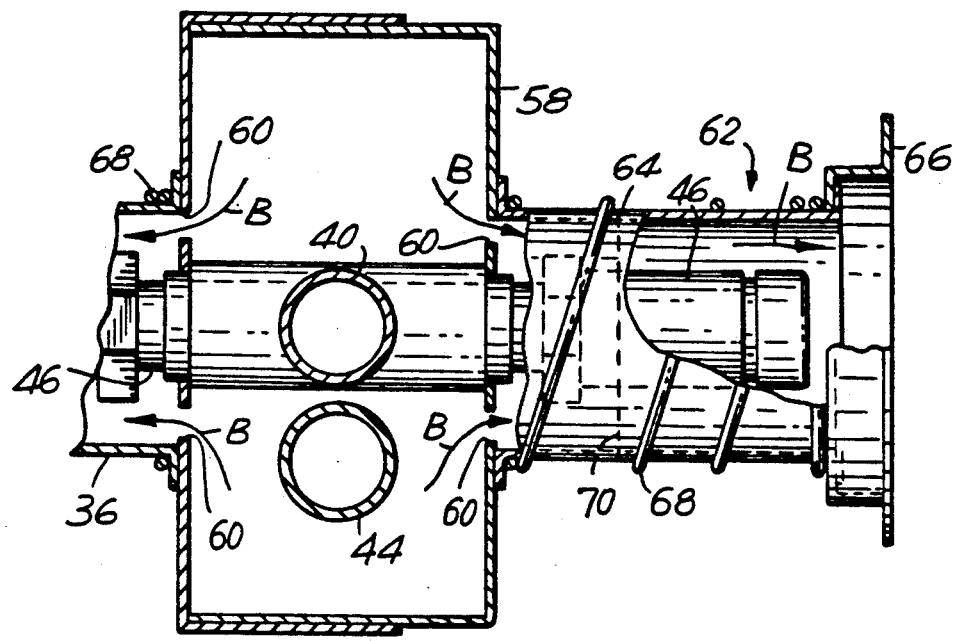
FIG. 7 is a sectional view of a water manifold and air plenum constructed in accordance with the invention.

An air plenum 58 is disposed between air supply plenum 74 at one end and cross bar 13 at the other end. Air plenum 58 is disposed about each pipe pair 38 and traces a path substantially parallel to each plenum shelf 14. A plurality of openings 60 are formed within air plenum 58 at each female coupling valve 46 to allow female coupling valve 46 to extend therethrough. As seen in FIG. 7, female coupling valve 46 is positioned within a docking cone 62. Docking cone 62 includes a cylinder 64 having a docking portion 66 slideably mounted thereon. A spring 68 is disposed about cylinder 64 for biasing docking cone 66 away from air plenum 58. Docking portion 66 has a diameter greater than recessed air diffuser 52 and comes in contact with wall 50. Cylinder 64 is mounted at opening 60 of air plenum 58 and forms an airtight seal therewith to provide an air conduit from air plenum 58 through docking portion 66 in a direction of arrows B. The inner circumference 70 of docking cone 62 is greater than the outer diameter of female coupling valve 46 to allow room for air to pass through docking cone 62. Air plenum 58 is coupled to a plenum supply duct 74 through an opening 76 provided at each shelf providing an air path from air supply plenum 74 through opening 76 to air plenum 58. Air supply plenum 74 may be connected to the house air supply system. However, in an exemplary embodiment a cage air supply unit is provided on rack 12 which intakes room air, filters the room air and provides a positive air pressure air flow in a direction of arrows C and D providing a position pressure air flow through plenum 58 to each cage 20.

As discussed above, at the location of each female coupling valve 46, a plurality of openings 60 are provided with air plenum 58 to allow air to escape from air plenum 58 to respective cages 20. Air plenum 58 is a closed end air plenum receiving air from air supply plenum 74 which travels towards cross bar 13 forming the sealed end of air plenum 58. As air travels along plenum 58, a portion of the air escapes through opening 60, lessening the pressure of air plenum 60 so that a minimal positive air pressure is provided at a cage 20 located at one end of a rack compared to a maximum air pressure provided to a cage 20 provided adjacent supply plenum 74.

To balance the positive air pressure provided to each cage 20, the number of openings 60 located at each female coupling valve 46 are varied. In an exemplary embodiment, seven docking positions are provided. In a first group consisting of two docking positions closest to air supply manifold 74, eight openings 60 are provided within plenum 58 at each docking position. A second group consisting of three docking positions which are next closest to air supply plenum 74 are each provided with a six hole pattern. The last two docking positions are provided with a five hole pattern. Accordingly, the air flow balancing is accomplished by decreasing the number of holes within each pattern to progressively increase the required outlet pressure at each docking position as the air flows from supply side of plenum 58 to the closed end of plenum 58. Additionally, by balancing each air supply location, the removal of any number of cages 20 from rack 12 does not affect the air balance to the remaining cages 20.

Reference is now made to FIGS. 1, 1a, 2, 3, 7 and 8 in which operation of the exemplary embodiment of the ventilated cage and rack system 10 is defined. Female coupling valve 46 is positioned at a height to receive male coupling valve 54 when cage 20 is slid into position resting on a shelf 14. The insertion of male coupling valve 54 opens female coupling valve 46 providing water flow from pipe 40 to drinking valve 56. Drinking valve 56 remains closed until pressure is applied thereon by an animal 76 when drinking, causing water to flow in the direction of arrow F. By providing water within each individual cage 20 upon drinking by each individual animal, cross contamination caused by spilling of drinking water or the animal coming in contact with the environment without cage 20 is severely reduced.

As seen in FIG. 8, spring 68 is compressible allowing docking portions 66 to slide along cylinder 64. Additionally, spring 68 biases docking portion 66 against sidewall 50 when cage 20 is moved towards air plenum 58. When cage 20 is pushed towards air plenum 58 to engage female coupling valve 46 with male coupling valve 54 docking cone 62 is compressed and cylinder 64 moves within recessed air diffuser 52 to form a substantially air tight gasket. Air flows in through opening 60 in the direction of arrows B about a diffusion plate 78 through openings 80 of air diffuser 52. Because the air is under positive pressure, the air within cage 20 is forced out of the cage through bonnet 24. Additionally, because air enters cage 20 through sidewall 50 of bottom 22 it pushes the heavier ammonia and carbon diode particles which nestle at the bottom of cage 20 before the air and out around lip 28 thus reducing the level of gases as well as humidity within the cage, better maintaining the status of the animals contained therein.

The air that is forced about lip 28 fills gap h between bonnet 24 and shelf 14. Negative pressure plenum shelf 14 draws the air from this space through openings 18. The air is then exhausted through rack exhaust plenum 16. Accordingly, any contaminants which pass from cage 20 are removed prior to coming in contact with any personnel. This embodiment provides both personnel protection and protection for the animals contained within cage 20.

Canopy guides 26 also act to align male coupling valve 54 with female coupling valve 46. Canopy guides 26 are provided at positions corresponding to female coupling valve 46 aligning with male coupling valve 54. Male coupling valve 54 opens female coupling valve 46 by insertion therein. Additionally, it is a friction fit which retains male coupling valve 54 within female coupling valve 46 along with the friction fit between canopy guides 26 and lower lip 28 of bonnet 24. Therefore, a slight amount of pressure in a direction coaxial with male coupling valve 54 connects or disconnects male coupling valve 54 and drinking valve 56 to or from female coupling valve 46 thus providing a quick release mechanism not requiring the touching of either coupling valve, again reducing the occurrence of cross contamination as well as making the use of ventilated cage and rack system 10 more efficient and less time consuming.

To remove an individual cage 20 from rack 12, cage 20 is moved away from plenum 58. This disconnects male coupling valve 54 from female coupling valve 46 thus closing female coupling valve 46 preventing any leakage of water and resulting cross contamination. Because of the positive pressure cage air system in combination with the negative pressure rack system, any contaminated air now in the rack is pulled through plenum shelf 14 and the status of the remaining cages 20 is not affected. Male coupling valve 54 does not extend beyond the surface of wall 50, allowing bottoms 20 to be stacked for storage within each other and making then autoclavable.

Reference is now made to FIGS. 4, 5, 9 and 10 in which another embodiment of the invention is provided. In this embodiment, the ventilated cage and rack 12 provides positive pressure air to each cage 20 and removes air through negative pressure plenum shelf 14. The substantial difference between the embodiments is that water is provided to the animals through a water bottle 34 supported in a wire bar lid 32. For simplicity, like numbers are utilized to indicate like structures.

A docking cone 62, having a docking portion 66 for coming in contact with side walls 50 of cage 20 is affixed to plenum 58. A spring retainer 84 is disposed within cylinder 64. Spring retainer 84 includes at least one pair of leaf springs 86 extending from a base 85. Elbows 87 are formed on each leaf spring in facing relation to provide a narrowed space therebetween.

Opening 60 within plenum 58 communicates with cylinder 64 of docking cone 62 to allow air to pass through docking cone 62 in the direction of arrows B. Additionally, cage 20 is provided with a recessed air diffuser 52 disposed therein. A diffusion plate 78 is mounted on air diffuser 52. A plurality of holes 80 are formed within recessed air diffuser 52 downstream of the air path from diffusion plate 78 to allow air to pass from plenum 58, through cylinder 64 into cage 20. A screw 88 is mounted at the center of diffusion plate 78 and extends within recess air diffuser 52.

During operation, cone 62 is again compressed against cage 20 as cage 20 is moved towards air plenum 58. Elbows 87 of leaf springs 86 are forced apart by screw 88 as screw 88 is inserted within docking cone 62. Since elbows 87 are integrally formed with leaf springs 86, elbows 87 are biased towards each other gripping screw 88 to maintain cage 20 in place. Docking cone 62 is compressed to form a substantially air tight gasket seal between air diffuser 52 and air plenum 58. Accordingly, filtered air flows in the direction of arrows B through openings 80 of air diffuser 52. Again, because the air is under positive pressure the air within cage 20 is forced out of cage 20 around lip 28 of bonnet 24. This air is then removed by negative air pressure plenum shelf 14. Again, protection is provided for both the animal contained within cage 20 as well as the personnel working with ventilated cage and rack system 10.

The grip of elbows 87 about screw 88 is a simple tension fit. Since it is a simple tension fit which retains screw 88 within spring retainer 84, only a slight amount of pressure is needed in a direction coaxial with screw 88 to separate cage 20 from air plenum 58, thus providing a quick release mechanism.

Because of the positive pressure cage air system in combination with the negative pressure rack system, any contaminated air now in the rack is pulled through negative pressure plenum shelf 14 and through air exhaust plenum 16 so that the status of the remaining cages 20 is not affected. Screw 88 does not extend beyond the surface of wall 50, allowing bottoms 20 to be stacked for storage within each other and making them autoclavable.

The above explanations have been provided in connection with a single sided ventilated rack for simplicity. However, the structure is equally applicable to a double sided ventilated rack in which the air plenum or air plenum and water manifold are disposed between the mirror sides of the double sided rack having docking cones and female coupling valves extending in both directions from plenum 58.

Additionally, in an exemplary embodiment, rack 12 is mounted on wheels 90 to allow portability from one area to another. A handle 92 is mounted on one side of rack 12 to aide in moving rack 12. Additionally, the use of a female coupling valve as the connection to the water manifold is by way of example only. The female coupling valve may extend from a recessed air diffuser to couple with a male coupling valve extending from the water manifold.

Accordingly, by providing a ventilated cage and rack system which delivers positive pressure air to the cage while confining the air exhaust from the cage to a limited area and providing a negative air pressure plenum which communicates with that area, both animal protection and personnel protection is provided in a ventilated cage and rack system. Additionally, such a configuration makes it possible to utilize an open rack ventilated cage and rack system.

It will thus be seen that the objects set forth above, among those made apparent from the preceding description, are efficiently attained and, since certain changes may be made in the above construction without departing from the spirit and the scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A wire bar lid for use in animal cage having a bottom portion and a filter bonnet, said wire bar lid comprising a perimeter having a length, a portion of said perimeter defining a flat surface for receiving a filter bonnet, a plurality of wire bars substantially extending in a lengthwise direction parallel to the length of said perimeter at substantially spaced intervals, each of said bars being supported within said perimeter, whereby said wire bar lid is adapted to be positioned between said filter bonnet and bottom portion, said perimeter limiting any openings formed between said filter bonnet and bottom when said filter bonnet is placed upon said bottom a skirt extending from said perimeter at a substantially right angle, a support flange affixed to said skirt, said plurality of wire bars being supported on said support flange so that said wire bars are supported below said perimeter; said cage being a cage level barrier cage.

2. A wire bar lid for use in an animal cage having a cage bottom and a cage bonnet, said wire bar lid comprising a frame adapted to be supported by a cage bottom; a skirt extending from said frame at a substantially right angle, a support flange affixed to said skirt, a plurality of wire bars extending the length of said frame at substantially parallel spaced intervals; said plurality of wire bars being supported on said support flange so that said bar wires are supported below said frame and within the cage bottom when the wire bar lid is supported by the cage bottom.

3. The wire bar lid of claim 2, wherein said frame, said skirt and said support flange are integrally formed with each other as a unitary member.

4. The wire bar lid of claim 2, wherein said bonnet is formed with a lip, said lip being dimensioned to receive said cage bottom and rest thereon, said frame being dimensioned to be disposed between said lip and said cage bottom.

* * * * *